United States Patent
Heinkele et al.

(10) Patent No.: US 9,243,977 B2
(45) Date of Patent: Jan. 26, 2016

(54) METHOD FOR DIAGNOSING A VALVE OF A FLUID SUPPLY LINE TO A LINE OF AN AIR SYSTEM OF A COMBUSTION ENGINE

(71) Applicants: Matthias Heinkele, Leonberg (DE); Michael Drung, Muehlacker (DE); Martin Kroener, Remchingen (DE)

(72) Inventors: Matthias Heinkele, Leonberg (DE); Michael Drung, Muehlacker (DE); Martin Kroener, Remchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 136 days.

(21) Appl. No.: 13/887,824

(22) Filed: May 6, 2013

(65) Prior Publication Data

US 2013/0298654 A1 Nov. 14, 2013

(30) Foreign Application Priority Data

May 8, 2012 (DE) .......................... 10 2012 207 655

(51) Int. Cl.
| | | |
|---|---|---|
| *G01M 15/10* | (2006.01) | |
| *G01M 15/09* | (2006.01) | |
| *F02M 25/07* | (2006.01) | |
| *F16K 37/00* | (2006.01) | |
| *F02D 41/00* | (2006.01) | |
| *F02M 35/10* | (2006.01) | |
| *F02M 25/06* | (2006.01) | |

(52) U.S. Cl.
CPC ........... *G01M 15/09* (2013.01); *F02M 25/0702* (2013.01); *F16K 37/0075* (2013.01); *F02D 41/0055* (2013.01); *F02M 25/06* (2013.01); *F02M 35/1038* (2013.01); *Y02T 10/121* (2013.01)

(58) Field of Classification Search
CPC .. G01M 15/09; G01M 15/10; F02M 25/0702; F02M 25/0754
USPC ................ 73/114.37, 114.69, 114.74, 114.76
See application file for complete search history.

(56) References Cited

U.S. PATENT DOCUMENTS

| | | | | |
|---|---|---|---|---|
| 5,513,616 | A * | 5/1996 | Matsumoto et al. ...... | 123/568.16 |
| 5,632,257 | A * | 5/1997 | Machida et al. ............... | 123/435 |
| 6,164,270 | A * | 12/2000 | Bidner et al. ............ | 123/568.16 |
| 7,739,027 | B2 * | 6/2010 | Kang et al. .................... | 701/108 |
| 8,631,691 | B2 * | 1/2014 | Tanaka ........................ | 73/114.74 |
| 2003/0131658 | A1 * | 7/2003 | Birkner et al. ............... | 73/118.1 |
| 2012/0240671 | A1 * | 9/2012 | Tanaka ........................ | 73/114.74 |
| 2013/0145831 | A1 * | 6/2013 | Nam ........................... | 73/114.74 |

FOREIGN PATENT DOCUMENTS

| | | |
|---|---|---|
| DE | 10 2008 002 721 | 12/2009 |
| DE | 10 2008 041 804 | 3/2010 |
| DE | 10 2009 002 746 | 11/2010 |

* cited by examiner

*Primary Examiner* — Eric S McCall
(74) *Attorney, Agent, or Firm* — Kenyon & Kenyon LLP

(57) ABSTRACT

In a method for diagnosing a valve in a fluid supply line to a suction line of an air system of a combustion engine, the fluid supply line being is part of an exhaust-gas recirculation system or a crankcase ventilation system, when the valve is actuated, a first pressure in the suction line is monitored for change, and an error of the valve is detected if the change of the first pressure lies outside a specific reference range when the valve is actuated.

12 Claims, 1 Drawing Sheet

METHOD FOR DIAGNOSING A VALVE OF A FLUID SUPPLY LINE TO A LINE OF AN AIR SYSTEM OF A COMBUSTION ENGINE

BACKGROUND OF THE INVENTION

1. Field of the Invention

The present invention relates to a method for diagnosing a valve of a fluid supply line, and to a computer program set up for this purpose.

2. Description of the Related Art

Different fluids may be provided in the fresh-air suction line of an internal combustion engine. For example, the crankcase in an internal combustion engine is able to be ventilated, and this ventilation can be rerouted to the fresh-air suction line of the engine (in particular into an induction manifold of the combustion engine). In addition, exhaust-gas recirculation lines are known, via which combustion gases are returned to the suction line of the combustion engine.

Such supply lines are able to be monitored with the aid of diagnoses. For example, published German patent application document DE 10 2008 041 804 A1 describes the diagnosis of an exhaust-gas recirculation system. The idea of this method is to use a pressure ratio within the air supply section (that is to say, the pressure upstream from the throttle valve versus the pressure downstream from the throttle valve) or between the air supply section and the exhaust-gas section (i.e., the intake manifold pressure versus the exhaust-gas recirculation pressure) or via a position of a throttle valve of the intake manifold in order to determine whether an adverse effect (especially sooting) is manifesting itself in the exhaust-gas recirculation system. To do so, the mentioned values of the pressure differential are compared to a reference value.

Published German patent application document 10 2008 002 721 A1 discloses the diagnosis of a ventilation system; in this case an error of the ventilation system can be detected through a brief interruption of the ventilation line between the crankcase and the air system of the combustion engine, and by monitoring the Lambda value of the exhaust gas of the combustion engine.

Published German patent application document DE 10 2009 002 746 A1 proceeds from a method for checking the operativeness of a tank ventilation system of a motor vehicle which is equipped with an internal combustion engine providing charge detection, based on the intake manifold pressure. The tank ventilation valve is opened in defined manner and/or actuated in closing manner, and the operativeness of the tank ventilation valve is inferred from the intake manifold pressure that comes about in the process.

BRIEF SUMMARY OF THE INVENTION

In accordance with the present invention, a simple diagnosis of the appropriate valve is able to detect a large number of the errors in such systems in a reliable and uncomplicated manner even in an exhaust-gas recirculation and crankcase ventilation, in that a pressure in the air system of a combustion engine is monitored for change during an actuation of the valve. In the method according to the present invention, a diagnosis of a valve of a fluid supply line of an exhaust-gas recirculation line or of a crankcase ventilation, to a suction line of an air system of a combustion engine takes place. In the process, a first pressure in the suction line is monitored for change when the valve is actuated, and an error of the valve is detected if the change of the first pressure lies outside a specific reference range during the actuation of the valve. The reference range is a pressure value range within which the pressure change caused by the valve actuation is expected if the valve is operating properly.

Thus, the diagnosis pertains to controlled valves of a fluid line in which a pressure sensor is post-connected in the flow direction of the fluid, in order to determine the pressure in the suction line into which the fluid line discharges. Via the valve, a mass flow of the fluid is routed into the suction line of the air system, especially into an intake manifold. In the steady state, the discharging mass flow corresponds to the inflowing mass flow. As the discharging mass flow from the intake manifold increases, the pressure in the manifold rises, with otherwise unchanged operating conditions. When the valve of the valve supply line is opened, the intake manifold pressure therefore rises. When the valve is closed, the intake manifold pressure drops correspondingly. This is able to be checked by thresholds (or by reference ranges defined with the aid of these thresholds), e.g., by a threshold for the delta of the pressure in the intake manifold prior to the change in the valve position, and some period of time following the change in the valve position. Different thresholds make it possible to check the change in the valve position both in terms of quality and quantity. Errors, such as: the valve does not open at all/sticks, the valve opens less than expected, the valve has soot deposits, the valve opens to a greater extent than expected, the valve does not close at all, are able to be detected in this manner.

The diagnosis is made possible by a measured pressure in the flow direction of the valve. If the valve is opened or closed, then this affects the pressure, and this effect is able to be checked by a measured pressure or by a determined change in pressure. In the case of a crankcase ventilation, just like in the case of an exhaust-gas recirculation, the flow direction is into the suction line or into the intake manifold. Nowadays, an intake-manifold pressure sensor or a differential-pressure sensor is frequently already installed in the intake manifold. No additional components are therefore required to perform the described diagnosis.

The selectivity of the diagnosis is a function of the operating point, that is to say, the additional quantities of the air system or the conditions therein. In the first order, it depends on the ratio of the mass flow flowing via the valve, and the discharging mass flow from the intake manifold. In order to improve the selectivity even further, additional influences on the intake-manifold pressure, such as the engine speed, temperature, camshaft position, and the position of other valves may be taken into account. Toward this end, for example, it may be checked that these influences vary only to a predefined degree during the diagnosis, so that a usable diagnosis result is obtained. It is also possible to compensate for these influences, for instance by converting the change in the influences into a pressure change and then to consider this in the evaluated pressure delta or in the reference ranges utilized for the comparison. In so doing, for instance, it is also possible to compensate for the pressure differential of the pressures upstream and downstream from the valve. The monitored pressure delta in the intake manifold varies linearly with the pressure upstream from the valve and is superimposed to the pressure ratio in non-linear fashion. The linear change is able to be compensated very well.

Up to a pressure ratio of approximately 0.54, the non-linear change has no effect; after that, the influence becomes increasingly stronger up to a vertical gradient at a pressure ratio of 1 (flow velocity across throttle according to Saint-Venant and Wantzel). This may be taken into account by a pressure delta as a switch-on condition or via the pressure ratio. The flow velocity is able to be compensated as well and the diagnosis range thus expanded as a result.

In one development the reference range therefore is able to be calculated on the basis of variables of the air system. Toward this end, algorithms or characteristic maps may be stored in a control unit and then be used to calculate an expected pressure change from currently measured or likewise calculated variables of the air system as a function of the magnitude of the actuation of the valve, and to furthermore calculate the reference range utilized for the comparison with the determined pressure change on this basis. This produces an especially flexible system that allows a diagnosis even under complex conditions, for instance when changes occur in different variables of the air system.

For example, the following may be entered in such a calculation of the reference range: a temperature of the air system, a position of an actuator of the air system, especially a throttle valve of the suction line, a camshaft position of the combustion engine, an engine speed of the combustion engine and a position of another valve of the air system. These quantities have been found to be especially important quantities of the air system, whose variations could influence the calculation to a considerable degree.

To be taken into account as another important quantity for such a calculation of the reference is a pressure differential between the first pressure in the suction line downstream from the valve, and a second pressure in the fluid supply line upstream from the valve. A prerequisite in this context is a determination of the second pressure with the aid of a pressure sensor or on the basis of a calculation using other available quantities.

As an alternative to the reference range calculation, a diagnosis is possible also on the basis of a comparison with a predefined reference range. This method is particularly easy to carry out. In so doing, the reference range may also be one of several predefined reference ranges, so that a flexible error detection furthermore is possible within the framework of the predefined reference ranges.

In the case of a comparison of the pressure change with a predefined reference range and also a comparison with a calculated reference range, it is advantageous to perform the diagnosis only under certain conditions of the air system and furthermore, to detect an error only under certain conditions of the air system. The reason for this is that an error detection is especially difficult or may include errors in certain conditions of the air system. In other words, such a marginal condition increases the quality of the detected errors considerably.

It is particularly advantageous if the error is detected only if the air system is in a steady-state or quasi-steady state, that is to say, if no or no large changes in quantities of the air system are at hand just then, especially changes in the pressure in the suction line or in the intake manifold. Such a state allows a particularly reliable diagnosis.

A steady-state or quasi-steady state of this type is detectable when a rotational speed of the combustion engine is essentially constant, when a position of an actuator in the air system, especially a throttle valve in the suction line, is essentially unchanged, when a position of another valve in the air system is essentially unchanged, or when several or all of the conditions apply.

Another, especially advantageous improvement of the diagnosis quality is achievable if an error is detected only if a pressure differential between the first pressure in the suction line and a second pressure in the fluid intake line upstream from the valve lies above a threshold value prior to or during the valve actuation. For if the pressure upstream and downstream from the valve is of equal magnitude or differs only slightly, no pressure change occurs in the actuation of the valve. If this additional condition were not provided, the diagnosis would detect errors.

In one preferred development, all steps of the described method are controlled by a computer program which is stored on an electronic storage medium in an electronic control unit, in particular an engine control unit.

It is understood that the features mentioned above and still to be explained below may be used not only in the indicated combinations, but in other combinations as well, or by themselves, without departing from the scope of the present invention.

DETAILED DESCRIPTION OF THE INVENTION

Figure 1:
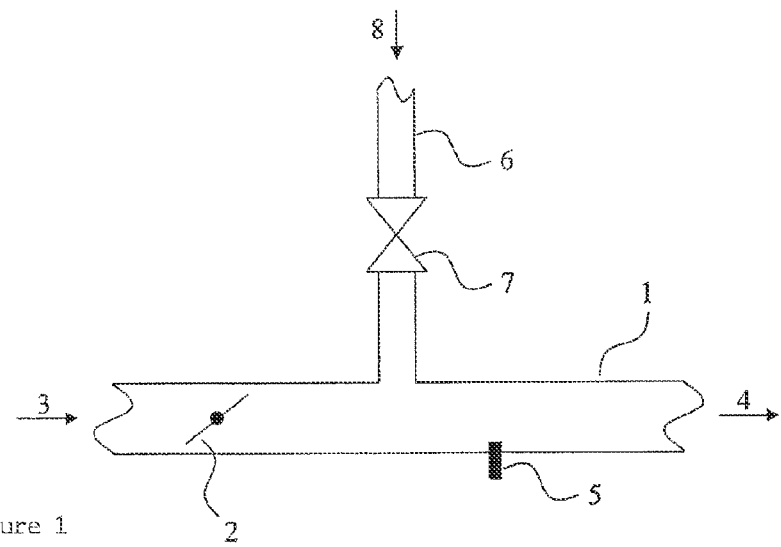
FIG. 1 schematically shows a section of a combustion engine.

The present invention is represented schematically in the drawing with the aid of specific embodiments, and described in detail below with reference to the drawing.

The cylinders of a combustion engine are supplied with air via an air system. The air is admitted into the appropriate cylinder with the aid of an intake valve. FIG. 1 schematically shows intake manifold 1 and throttle valve 2 as components of such an air system. The air charge supplied to the cylinders via intake manifold 1 is able to be influenced by the position of throttle valve 2. Upstream from the throttle valve (indicated by arrow 3) is an air supply line. Downstream from the throttle valve (indicated by arrow 4) are the intake valve and cylinder of the combustion engine. Furthermore, a pressure sensor 5, which measures the pressure in intake manifold 5, is situated on intake manifold 1, downstream from throttle valve 2. In addition, a fluid supply line 6 discharges into the intake manifold downstream from the throttle valve. A valve 7 is situated inside fluid supply line 6 in order to control the supplied fluid quantity. The supplied fluid comes from a fluid source upstream from valve 7 (indicated by arrow 8).

When the combustion engine is operated, the pressure in a crankcase increases, e.g., by collecting combustion gases from the combustion chambers and by the formation of oil mist. For one, this may have a detrimental effect on the operation of the cylinders and, for another, it could also lead to a leakage of hydrocarbons and oil mist into the environment of the combustion engine. To avoid the generation of increased pressure in the crankcase, crankcase ventilation is provided, of which a ventilation line is part. In one preferred development of FIG. 1, fluid supply line 6 is such a ventilation line of a crankcase ventilation.

In combustion engines having exhaust-gas recirculation (AGR), combustion gas from the cylinders is discharged via an exhaust-gas section. An AGR line is provided between this exhaust-gas section and an intake manifold of the combustion engine. In one alternative development of FIG. 1, fluid supply line 6 is such an AGR line. As a result, valve 7 is an AGR valve, via which an AGR rate is able to be adjusted.

Figure 2:
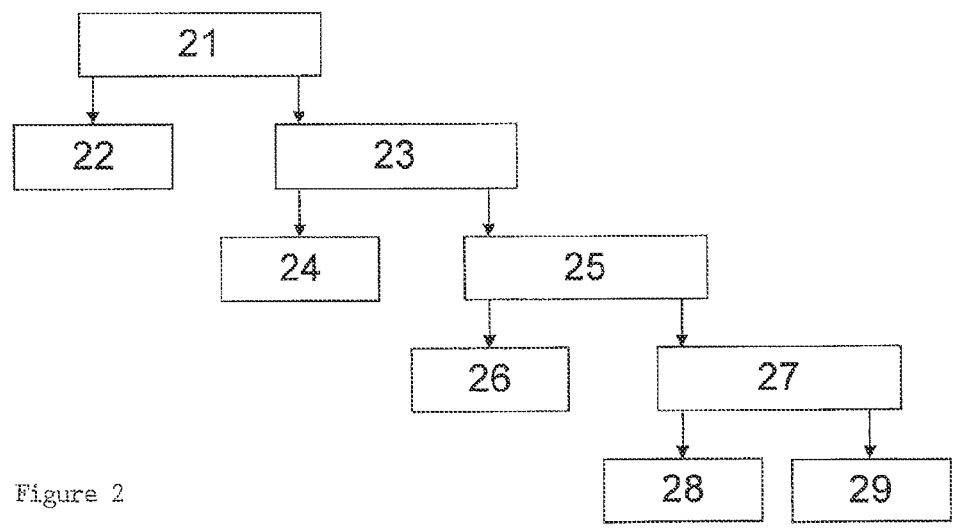
FIG. 2 shows the steps of a method for performing a valve diagnosis.

FIG. 2 schematically shows an exemplary sequence of a diagnosis of a valve of a fluid line, as it is shown in FIG. 1 by way of example. In a first step 21, it is determined whether the valve is actuated. If no actuation is detected, branching to step 22 takes place and no diagnosis is performed. The actuation discovered in step 21 may be an actuation specifically provided for diagnostic purposes, but it could also be an actuation provided during normal operation of the combustion engine. If an actuation of the valve has occurred, branching to step 23 takes place. The intensity of the actuation (i.e., the requested valve opening or closing) may likewise be taken into consideration in the method. This allows a diagnosis to be dispensed with if the actuation is minimal. An expected change in pressure may also depend on the magnitude of the valve opening or the valve closing.

In step 23 it is determined whether the conditions in the air system are suitable for performing a meaningful or reliable diagnosis. To do so, for example, it may be checked whether the pressure in the air system, more precisely, in the suction line or the intake manifold, is essentially constant immediately prior to the actuation or within a specified time interval prior to the actuation. Furthermore, it may also be checked whether a throttle valve position is essentially unchanged in a period prior to the actuation, whether an engine speed is essentially constant, whether other valves in the air system have essentially unchanged positions, etc. If the prescribed conditions are not met, branching to step 24 takes place and the diagnosis will not be performed. If the prescribed conditions are satisfied, branching to step 25 is implemented.

In step 25 it is checked whether a pressure differential between the pressure upstream from the valve to be checked and the pressure downstream from the valve to be checked is of a magnitude such that a pressure change is ensured downstream from the valve that is sufficient for the intended diagnosis when the valve is opened. This step is omitted if no means are available to determine the pressure on the side of the valve facing away from the suction line, or if a sufficient pressure differential is ensured by the system design or is present with a high degree of probability. As a result, step 25 is optional. If it is performed and if the pressure differential is insufficient, branching to step 26 takes place and the diagnosis will not be performed. If the differential is sufficient or if it is not checked, branching to step 27 occurs.

In step 27, a pressure change in the suction line is determined. For example, a gradient or a temporal change or a derivation of a determined pressure value may be calculated for this purpose. Pressure values determined by a pressure sensor in the intake manifold at an instant immediately prior to the actuation of the valve, during the actuation of the valve, and following the actuation of the valve are preferably utilized for this purpose. It is also possible to form the pressure difference between a particular instant prior to the actuation and a specific instant following the actuation. This value is compared to a value range to be expected in the corresponding actuation under the given conditions of the air system. This reference range may either be selected from a series of predefined reference ranges, or calculated from quantities of the air system. For example, an actuator position, e.g., a throttle valve position, a temperature value of the air system, the engine speed of the combustion engine, the pressure differential upstream and downstream from the valve, the magnitude of the actuation of the valve, a camshaft position etc. may be considered in such a selection or calculation.

If the pressure change lies within the reference range, that is to say, the pressure change is within the expected thresholds, branching to step 28 takes place and the diagnosis is terminated without error output. If the pressure change lies outside the predefined pressure threshold values (i.e., outside the reference range), branching to step 29 occurs. The diagnosis detects an error. This error may be forwarded directly or be forwarded if a certain number of such errors has been detected.

The described method may also be repeated continuously, either until an error report or possibly also a positive acknowledgment has been received. Once the report has been transmitted, the diagnosis may pause or be continued immediately, or start from the beginning again.

What is claimed is:

1. A method for diagnosing a valve in a fluid supply line to a suction line of an air system of a combustion engine, the method comprising:
   actuating the valve;
   monitoring a first pressure in the suction line for a change when the valve is actuated; and
   detecting an error of the valve if the change in the first pressure during the actuation of the valve lies outside a specified reference range;
   wherein the fluid supply line is part of an exhaust-gas recirculation system or a crankcase ventilation system,
   wherein a magnitude of the actuation of the valve is taken into account in the diagnosis,
   wherein the reference range is specified on the basis of operating characteristic values of the air system,
   wherein the reference range is specified based on at least one of a temperature of the air system, a position of a throttle valve of the suction line, a camshaft position of the combustion engine, an engine speed of the combustion engine, and a position of another valve of the air system, and
   wherein the reference range is specified based on a pressure differential between the first pressure in the suction line downstream from the valve and a second pressure in the fluid supply line upstream from the valve.

2. The method as recited in claim 1, wherein the error is detected only if the air system satisfies at least one predefined condition.

3. The method as recited in claim 2, wherein the error is detected only if the air system is in one of a steady-state or a quasi-steady state at an instant prior to the actuation of the valve.

4. The method as recited in claim 3, wherein the one of the steady-state or the quasi steady state is detected if at least one of a rotational speed of the combustion engine is constant, the position of the throttle valve in the suction line is unchanged, the position of another valve in the air system is unchanged, and the pressure in the suction line is constant.

5. The method as recited in claim 2, wherein the error is detected only if the pressure differential between the first pressure in the suction line and the second pressure in the fluid supply line upstream from the valve lies above a specified threshold value one of prior to or during the actuation of the valve.

6. The method as recited in claim 5, wherein the first pressure in the suction line is an intake manifold pressure determined by one of an intake manifold pressure sensor or a differential-pressure sensor.

7. A non-transitory computer-readable data storage medium storing a computer program having program codes which is executable on a computer, comprising:
   a program code arrangement having program code for diagnosing a valve in a fluid supply line to a suction line of an air system of a combustion engine, wherein the fluid supply line is part of an exhaust-gas recirculation system or a crankcase ventilation system, by performing the following:
   actuating the valve;
   monitoring a first pressure in the suction line for a change when the valve is actuated; and
   detecting an error of the valve if the change in the first pressure during the actuation of the valve lies outside a specified reference range;

wherein a magnitude of the actuation of the valve is considered in the diagnosis, wherein the reference range is specified based on operating characteristic values of the air system, wherein the reference range is specified based on at least one of a temperature of the air system, a position of a throttle valve of the suction line, a camshaft position of the combustion engine, an engine speed of the combustion engine, and a position of another valve of the air system, and wherein the reference range is specified based on a pressure differential between the first pressure in the suction line downstream from the valve and a second pressure in the fluid supply line upstream from the valve.

8. The computer-readable data storage medium as recited in claim 7, wherein the error is detected if the air system satisfies at least one predefined condition.

9. The computer-readable data storage medium as recited in claim 8, wherein the error is detected if the air system is in one of a steady-state or a quasi-steady state at an instant prior to the actuation of the valve.

10. The computer-readable data storage medium as recited in claim 9, wherein the one of the steady-state or the quasi-steady state is detected if at least one of a rotational speed of the combustion engine is constant, the position of the throttle valve in the suction line is unchanged, the position of another valve in the air system is unchanged, and the pressure in the suction line is constant.

11. The computer-readable data storage medium as recited in claim 8, wherein the error is detected if the pressure differential between the first pressure in the suction line and the second pressure in the fluid supply line upstream from the valve lies above a specified threshold value one of prior to or during the actuation of the valve.

12. The computer-readable data storage medium as recited in claim 11, wherein the first pressure in the suction line is an intake manifold pressure determined by one of an intake manifold pressure sensor or a differential-pressure sensor.

* * * * *